(12) United States Patent
Del Rey et al.

(10) Patent No.: US 11,708,675 B2
(45) Date of Patent: Jul. 25, 2023

(54) FUSEGATE WITH ICE-BREAKING SYSTEM

(71) Applicant: HYDROPLUS, Nanterre (FR)

(72) Inventors: Franck Del Rey, Jouy-en-Josas (FR); Camille Perard, Rueil-Malmaison (FR); Pierrick Tessereau, Tours (FR)

(73) Assignee: HYDROPLUS, Nanterre (FR)

( * ) Notice: Subject to any disclaimer, the term of this patent is extended or adjusted under 35 U.S.C. 154(b) by 0 days.

(21) Appl. No.: 17/764,343

(22) PCT Filed: Sep. 11, 2020

(86) PCT No.: PCT/FR2020/051567
§ 371 (c)(1),
(2) Date: Mar. 28, 2022

(87) PCT Pub. No.: WO2021/064302
PCT Pub. Date: Aug. 4, 2021

(65) Prior Publication Data
US 2022/0349140 A1    Nov. 3, 2022

(30) Foreign Application Priority Data
Oct. 1, 2019 (FR) ........................... 1910874

(51) Int. Cl.
*E02B 7/16* (2006.01)
*E02B 8/06* (2006.01)
*E02B 1/00* (2006.01)

(52) U.S. Cl.
CPC ................ *E02B 8/06* (2013.01); *E02B 1/003* (2013.01); *E02B 7/16* (2013.01)

(58) Field of Classification Search
CPC ............... E02B 7/16; E02B 8/06; E02B 1/003
See application file for complete search history.

(56) References Cited

U.S. PATENT DOCUMENTS

| | | | |
|---|---|---|---|
| 5,032,038 A | 7/1991 | Lemperiere | |
| 5,195,846 A | 3/1993 | Lemperiere | |
| 8,591,149 B2 * | 11/2013 | Lacroix | E02B 8/06 405/92 |
| 10,815,632 B2 * | 10/2020 | Del Rey | E02B 8/06 |

FOREIGN PATENT DOCUMENTS

| | | | | |
|---|---|---|---|---|
| CN | 105951684 A | * | 9/2016 | ............. E02B 1/003 |
| CN | 205669187 U | * | 11/2016 | |
| CN | 205776125 U | * | 12/2016 | ............. E02B 1/003 |
| EP | 0434521 | | 6/1991 | |
| EP | 0493183 | | 7/1992 | |
| KR | 20100037286 A | * | 4/2010 | |

OTHER PUBLICATIONS

Search Report issued in Int'l Appl. No. PCT/FR2020/051567 (2020).

* cited by examiner

*Primary Examiner* — Frederick L Lagman
(74) *Attorney, Agent, or Firm* — Barnes & Thornburg LLP; G. Peter Nichols

(57) ABSTRACT

A fusegate for a hydraulic structure includes a trough with walls for attaching the normal barrage at a predetermined height, a pressure chamber provided between a base of the fusegate and the upper surface of the spillway, a means for pressurising the chamber according to a maximum predefined height of a water level upstream of the fusegate, the fusegate further comprising systems for breaking ice which are attached to the gate.

7 Claims, 4 Drawing Sheets

FUSEGATE WITH ICE-BREAKING SYSTEM

CROSS REFERENCE TO RELATED APPLICATIONS

This application is a U.S. nationalization under 35 U.S.C. § 371 of International Application No. PCT/FR2020/051567, filed 11 Sep. 2020, which claims priority to French Patent Application No. 1910874, filed 1 Oct. 2019. The disclosures set forth in the referenced applications are incorporated herein by reference in their entireties.

TECHNICAL FIELD OF THE INVENTION

The invention relates to a fustigate intended to equip a hydraulic structure such as a river weir, a spillway or a flood spillway, Hereinafter, these three types of structures will be referred to as "spillway".

PRIOR ART

Fusegates are installed on the crest of a spillway in order to allow the level of water retained upstream of these structures to be raised or to improve their throughput. In a similar way, when installed in the body of a dike, fusegates make it possible to evacuate floods toward a buffer reservoir or toward a surface chosen to receive and store these volumes of water, and thus protect areas situated downstream of the fusegates against flooding.

The patents EP0434521A1 and EP0493183A1 describe such fusegates. Fusegates are self-stable elements that are retained downstream by stops. Each module or gate is made up of three parts: the trough, the pressurizing chamber and the supply well. A seal ensures the sealing of the system and drainage holes drain the chamber in the event of supply thereof. In normal operation, during most floods, the water simply flows over the fusegates that act as a free-flowing weir. In the event of an exceptional flood, the pressurizing chamber of a gate is supplied when the water level exceeds the top of the lips of the well. As soon as the drainage holes are saturated, a pressure builds up beneath the gate that unbalances it and causes it to tilt downstream. As the water rises, the gates tilt one after the other. Their degree of tilting is adjusted with precision by the altimetric setting of the well, which differs from one tilting unit to another. The shapes that the gates can take and the construction materials for producing them are varied. They depend on the technical, economic and environmental requirements of the project in which they are integrated.

However, in very cold climatic situations, and in the absence of floods, the formation of a layer of ice on the surface of the impoundment can generate, due to temperature variations and the induced expansion, a horizontal thrust force on the upstream walls of the gate, and this causes a destabilizing moment that could cause the module to be rotated. This rotation could possibly cause the fusegate to tilt downstream.

DISCLOSURE OF THE INVENTION

The aim of the invention is to combine a fusegate with a system for breaking a layer of ice situated close to the upstream part of the fusegate.

To this end, there is provided, according to the invention, a fusegate for a hydraulic structure having a trough comprising walls making it possible to fix the normal impoundment at a predetermined height, a pressurizing chamber provided between the base of the fusegate and the upper surface of the spillway, means for pressurizing the chamber according to a predefined maximum height of a water level upstream of the fusegate, the fusegate also having systems for breaking ice that are attached to the gate.

Advantageously, but optionally, the fusegate according to the invention has at least one of the following technical features:
- the systems for breaking ice have at least one elongate element, a free end of which is positioned at a height corresponding to the possible presence of a layer of ice on the water impoundment, lower than the reservoir impoundment;
- the systems for breaking ice have at least one elongate element in the shape of an "L", one end of which is attached to the trough;
- the end is attached either by welding, or by bolting/screwing, or by chemical or mechanical anchoring to the fusegate or to the attachment bar;
- the elongate element comprises a free end that has a tip;
- the spike tip is oriented vertically;
- the elongate element comprises a free end that has a plate; and,
- the plate extends in a horizontal plane.

BRIEF DESCRIPTION OF THE FIGURES

Other features and advantages of the invention will become apparent upon reading the following descriptions, in conjunction with the appended drawings:

FIG. 4a and

FIG. 5a and

FIG. 6a and

For greater clarity, identical or similar elements are identified by identical reference signs in all of the figures.

DETAILED DESCRIPTION OF AN EMBODIMENT

Figure 1:
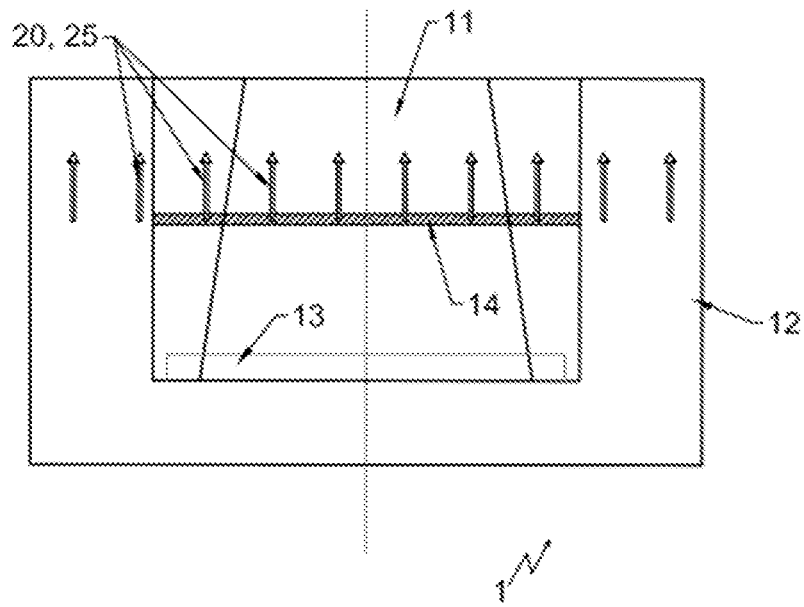
FIG. 1 is an upstream view of a fusegate equipped with the system for breaking ice according to the invention in the presence of a layer of ice.
Figure 2:
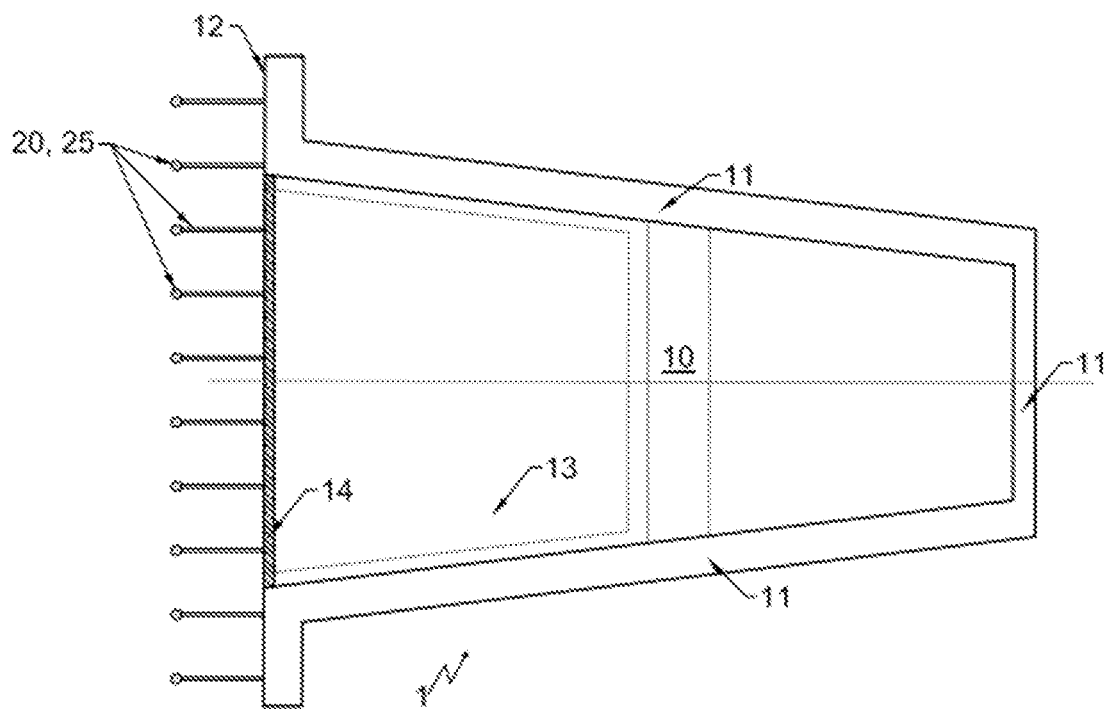
FIG. 2 is a top view of the fusegate equipped with the system for breaking ice according to the invention in FIG. 1.
Figure 3:
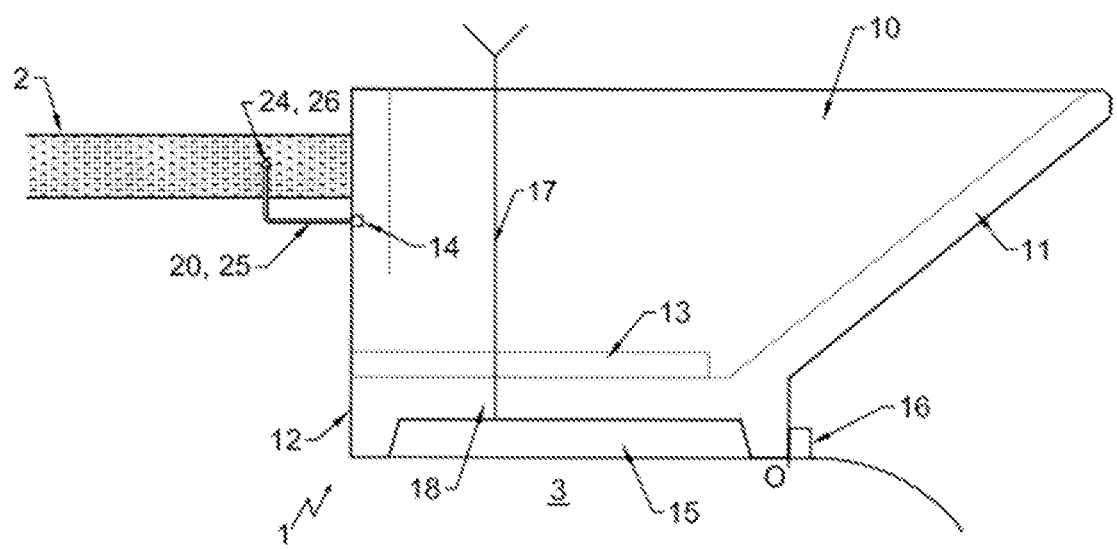
FIG. 3 is a transverse section of the fusegate equipped with the system for breaking ice according to the invention in FIG. 1.

With reference to FIGS. 1 to 3, a fusegate 1 according to the invention will be described. The fusegate 1 according to the invention has a trough 10 comprising walls 11 allowing spillover at a predetermined height. The fusegate 1 according to the invention also comprises a base 18 intended to rest on a spillway 3 of a hydraulic structure. The fusegate 1 according to the invention is laid under gravity on the spillway 3 of the hydraulic structure. Stops 16 formed on the spillway 3 prevent the downstream displacement of the fusegate 1 according to the invention. The webs 11 extend from the base 18 of the fusegate 1 according to the invention. The fusegate 1 according to the invention also comprises a ballast weight 13 situated on the base 18. A chamber 15 is formed between the base 18 and the upper surface of the spillway 3 of the hydraulic structure. In addition, the fusegate 1 according to the invention has a well 17 forming a means for pressurizing the chamber 15, via a hydraulic duct connecting the elements 15 and 17. The well 17 has lips adjusted to a predetermined maximum height that is specific to the fusegate 1 according to the invention. The documents EP0434521A1 and EP0493183A1 describe fusegates of this type and can be consulted for further information.

The fusegate 1 according to the invention also has a series of systems for breaking ice 20, 25 that protrude upstream of the fusegate 1 according to the invention, in this case from an upstream face 12 of the fusegate 1 according to the invention. Thus, the systems for breaking ice 20, 25 are attached to and upstream of the trough 10 of the fustigate 1 according to the invention. The systems for breaking ice 20, 25 are attached over the entire width of the fusegate according to the invention. An attachment bar 14 can be provided so as to ensure uniform distribution of the system for breaking ice 20, 25 over the entire width of the fusegate 1 according to the invention.

Figure 4A:
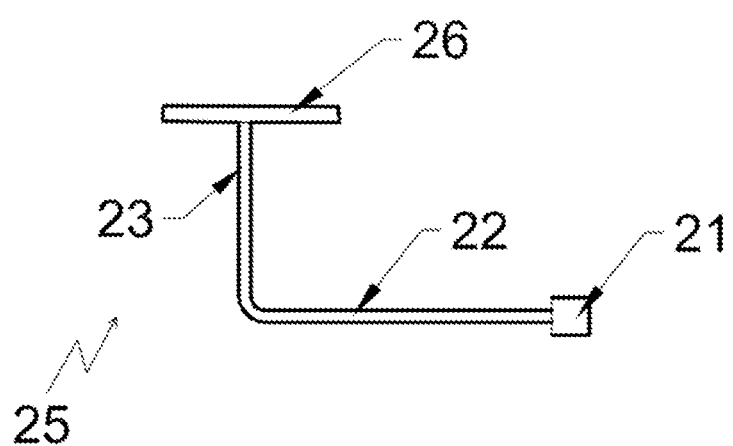
Figure 4B:
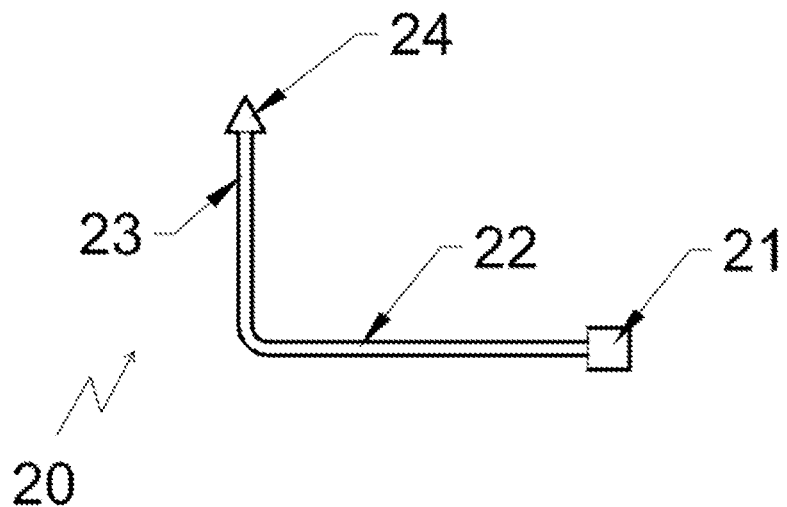
FIG. 4b are side views showing two examples of a system for breaking ice according to the invention.

With reference to FIGS. 4a and 4b, two embodiments of systems for breaking ice 20, 25 will be described in greater detail. According to a first embodiment, the systems for breaking ice have an elongate element 20, in the shape of an "L", comprising a first horizontal bar 22 having at one end an anchoring element 21 and having at its other end a vertical bar 23, a free end of which comprises a spike tip 24. According to a second embodiment, the systems for breaking ice have an elongate element 25 in the shape of an "L" like the elongate element 20 described above. The elongate element 25 differs from the elongate element 20 in that the free end of the vertical bar 23 has a plate 26 positioned perpendicular to the axis of the vertical bar 23. The plate 26 then extends in a horizontal plane, once the elongate element 25 has been attached to the fusegate 1 according to the invention. The elongate elements 20, 25 are made from materials such as metal alloys, resins, a combination of steel and concrete, etc. In a variant embodiment, the tip 24 and the plate 26 can be replaced by other geometries.

In order to attach the elongate elements 20, 25 to the upstream part of the fusegate 1 according to the invention, the anchoring elements 21 are configured depending on the materials forming the fusegate 1 according to the invention. In the case in which the fusegate 1 according to the invention has webs 11 of metallic type or has an attachment bar 14, the anchoring element 21 is welded or bolted/screwed to the structure of the fusegate 1 according to the invention or to the attachment bar 14. In the case in which the fusegate 1 according to the invention is made of concrete, the anchoring element 21 is directly anchored chemically or mechanically in the concrete forming the fusegate 1 according to the invention. The attachment of the elongate elements 20, 25 to the upstream face 12 of the fusegate 1 according to the invention is carried out such that the tips 24 and plates 26 of the elongate elements 20, 25 respectively are directed upward, as is illustrated in FIG. 1 or 3. In addition, the anchoring or attachment height of the elongate elements 20, 25 is chosen such that the tip 24 or the plate 26 is situated in any layer of ice 2 that may form on the surface of the impoundment of water in the event of very cold extreme climatic conditions. This anchoring or attachment height is lower than the predetermined impoundment height of the wall 11 of the fusegate 1 according to the invention.

Figure 5A:
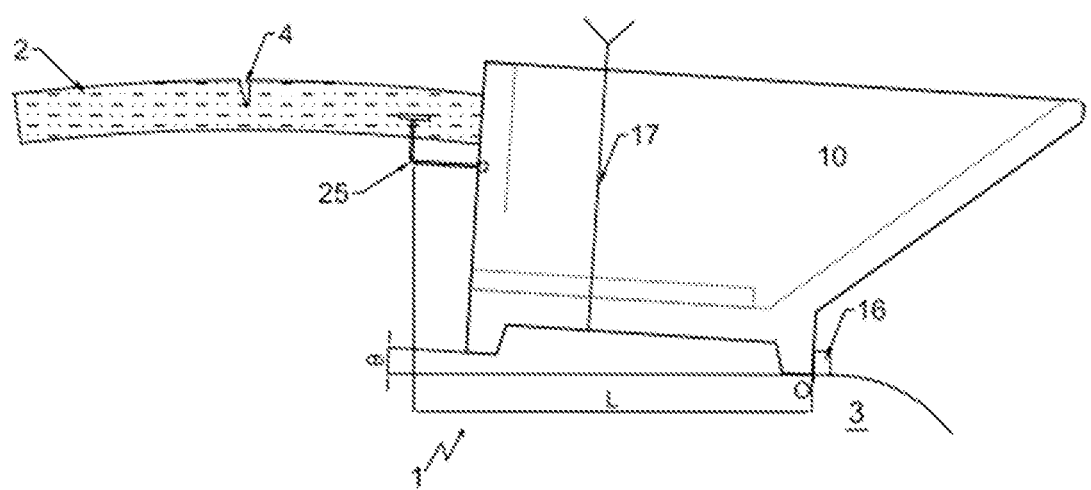
Figure 5B:
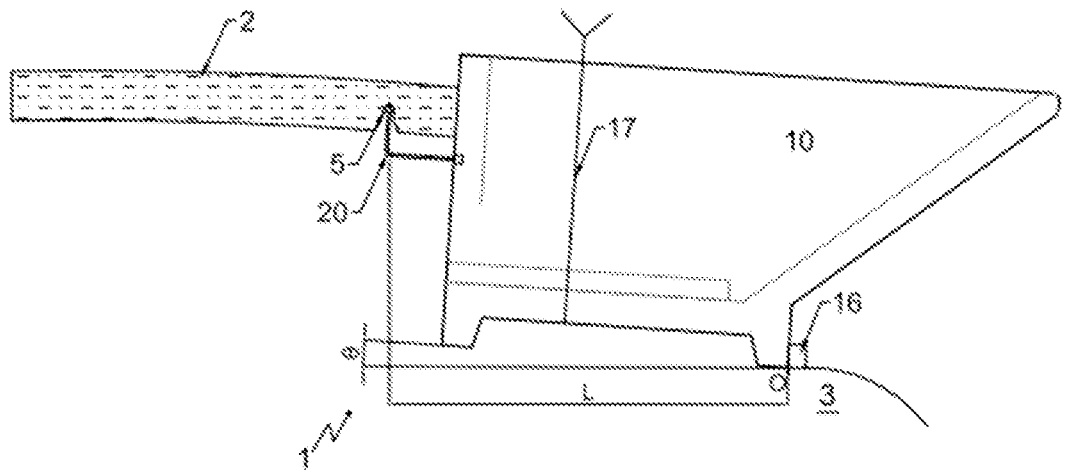
FIG. 5b are transverse sections of the fusegate equipped with the system for breaking ice according to the invention in the presence of a layer of ice, at the start of rotation under the effect of the destabilizing moment caused by thermal expansion of the layer of ice.

With reference to FIGS. 5a, 5b, 6a and 6b, the operation of the fusegate 1 according to the invention that has just been described in detail will be described. In a preliminary manner, in the situation illustrated in FIG. 1, the fusegate 1 according to the invention is in a stable position on the spillway 3 of the hydraulic structure. The fusegate 1 according to the invention is arranged so as to create a punching or shear force in the layer of ice 2 in order to break the latter during a start of tilting rotation of the fusegate 1 according to the invention about an axis of rotation O situated at the stop 16 positioned on the spillway 3 of the hydraulic structure. This start of rotation of the fusegate 1 according to the invention is illustrated by an angle θ in FIGS. 5a and 5b. The angle θ has to be large enough to induce shear and/or bending stresses in the layer of ice 2, via systems for breaking ice 20, 25, until said layer of ice 2 breaks, while at the same time remaining smaller than a calculated angle $θ_{limit}$ specific to the fusegate 1 according to the invention so as to guarantee it general stability until the layer of ice breaks, To this end, the fusegate 1 according to the invention is dimensioned so as to induce a shear stress that is dependent on thrust due to the thermal expansion of the layer of ice 2. The rotation of the fusegate 1 according to the invention by an angle θ causes a vertical displacement of the tip 24 or of the plate 26 of the elongate element 20, 25 respectively. This vertical displacement $L_v$ is characterized by the formula $L_v = L \sin θ$, in which L is the vertical projection of the tip 24 or of the plate 26 and the axis of rotation O of the fusegate 1 according to the invention that is situated at the stop 16, as illustrated in FIGS. 5a and 5b. Depending on the embodiment of the elongate element 20, 25, this vertical displacement $L_v$ will induce a shear or bending stress in the layer of ice 2. This will cause, in the case of the elongate element 25, a crack 4 in the layer of ice 2 at a distance from and upstream of the elongate element 25 and in particular the plate 26. In the case of the elongate element 20, the tip 24 will create a crack 5 at said tip 24 of the elongate element 20. Thus, the greater the thrust due to the thermal expansion of the layer of ice 2, the greater the shear force induced in the layer of ice 2 will be.

Another role is fulfilled by the systems for breaking ice 20, 25 of the fusegate 1 according to the invention. Specifically, when the tip 24 or the plate 26 is engaged in the layer of ice 2, this situation induces an increase in a stabilizing moment of the fusegate 1 according to the invention by creating a connection between the ice and the fusegate 1 according to the invention. This is added to a moment associated with the adhesion stress acting at the ice/fusegate interface at a contact surface between the layer of ice 2 and the fusegate 1 according to the invention. If the angle of rotation 9 of the fusegate 1 according to the invention is zero, the additional moment induced by the connection between the ice and the systems for breaking ice 20, 25 is also zero. This additional moment tends to increase as soon as the fusegate 1 according to the invention begins to rotate about the axis O at the stop 16, regardless of the value of the non-zero angle θ.

Such an operation and role of the fusegate 1 according to the invention makes it possible to have a greater stabilizing moment compared with the fusegates of the prior art and therefore to react some or all of the destabilizing moments induced by the thrust forces associated with the thermal expansion of the layer of ice 2 on the fusegate 1 according to the invention. Thus, this makes it possible to create stabilizing forces after a start of rotation of the fusegate 1 according to the invention and thus to contain the tilting angle θ within an interval (less than $θ_{limit}$) that does not allow complete tilting of the fusegate 1 according to the invention.

Figure 6A:
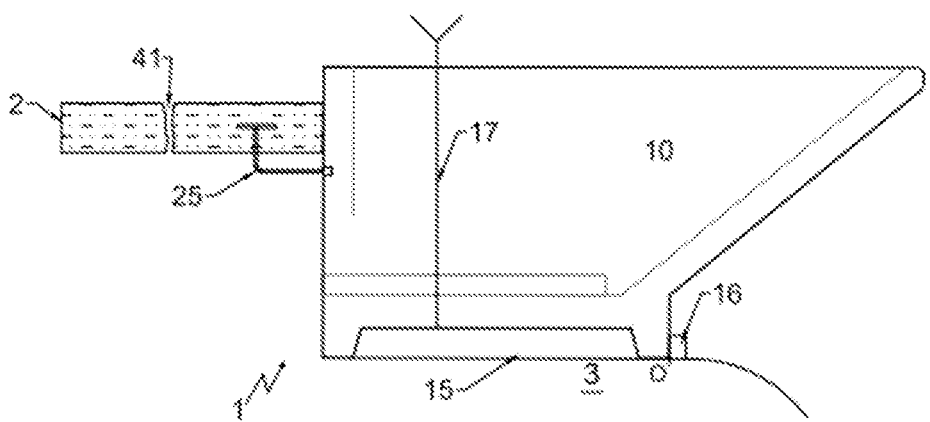
Figure 6B:
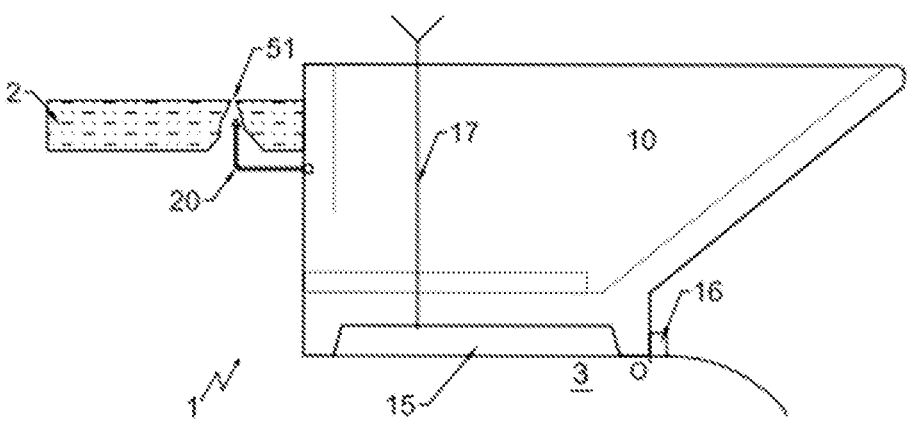
FIG. 6b are transverse sections of the fusegate according to the invention that is equipped with the system for breaking ice according to the invention after a return to its normal position following breakage of the ice.

Once the layer of ice has been broken, the fusegate 1 according to the invention returns to its initial position in which the angle θ is zero, as illustrated in FIGS. 6a and 6b, with the creation and the presence within the layer of ice of a crack due to a bending break 41 and/or to a shear break 51 in the vicinity of the elongate elements 25, 20 respectively.

Such a structure of the fusegate 1 according to the invention that has just been described and of which the operation has been presented makes it possible to reduce the thrust due to the thermal expansion of a layer of ice 2 that forms on the impoundment of water upstream of the fusegate 1 according to the invention in the case of very cold extreme conditions, while at the same time avoiding disturbing the hydraulic flow. Specifically, the stability of the fusegate 1 according to the invention is governed by stabilizing moments induced by stabilizing forces such as the self-weight of the fusegate, the weight of the volume of water situated in the trough 10, etc., and also by destabilizing moments that are induced by destabilizing forces such as the hydrostatic pressure of the water exerted on the fusegate 1 according to the invention, the underpressure prevailing in the chamber 15 of the fusegate in the event of exceptional flooding and, in the case in which a layer of ice 2 is present, the destabilizing force due to the thermal expansion thereof. As a result, the stability margin of the fusegate 1 according to the invention is the difference between all the stabilizing moments and destabilizing moments. This parameter is always positive or zero. In the case in which the stability margin is zero, the fusegate 1 according to the invention is in a state of instability and rotation, or even complete tilting, occurs.

Of course, it is possible to make numerous modifications to the invention without departing from the scope thereof.

The invention claimed is:

1. A fusegate for a hydraulic structure having
   a trough comprising walls making it possible to fix the normal impoundment at a predetermined height,
   a pressurizing chamber provided between a base of the fusegate and an upper surface of a spillway on which the fusegate is positioned,
   means for pressurizing the pressurizing chamber according to a predefined maximum height of a water level upstream of the fusegate, wherein the fusegate also has systems for breaking ice that are attached to the fusegate
   wherein the systems for breaking ice have at least one elongate element, a free end of which is positioned at a height corresponding to the possible presence of a layer of ice on the water impoundment, lower than the impoundment height, and
   wherein the systems for breaking ice have at least one elongate element in the shape of an "L", one end of which is attached to the trough.

2. The fusegate according to claim 1, wherein the systems for breaking ice protrude from an upstream face of the trough.

3. The fusegate according to claim 1, wherein the end is attached either by welding, or by bolting/screwing, or by chemical or mechanical anchoring to the fusegate.

4. The fusegate according to claim 1, wherein the elongate element comprises a free end that has a tip.

5. The fusegate according to claim 4, wherein the tip is oriented vertically.

6. The fusegate according to claim 1, wherein the elongate element comprises a free end that has a plate.

7. The fusegate according to claim 6, wherein the plate extends in a horizontal plane.

* * * * *